United States Patent [19]
Jayson

[11] 3,959,602
[45] May 25, 1976

[54] TELEPHONE SUBSTATION CIRCUIT

[75] Inventor: Joel Stanley Jayson, Chatham, N.J.

[73] Assignee: Bell Telephone Laboratories, Incorporated, Murray Hill, N.J.

[22] Filed: Nov. 19, 1974

[21] Appl. No.: 525,209

[52] U.S. Cl. ............................................. 179/81 R
[51] Int. Cl.² ........................................ H04M 1/00
[58] Field of Search ............. 179/81 R, 81 C, 84 L, 179/90 AN, 90 L; 240/2.1; 58/50

[56] References Cited
UNITED STATES PATENTS

| | | | |
|---|---|---|---|
| 3,132,211 | 5/1964 | Bauman | 179/81 C |
| 3,141,068 | 7/1964 | Cleary | 179/81 C |
| 3,412,213 | 11/1968 | McCay | 179/81 C |
| 3,784,760 | 1/1974 | Rickert | 179/90 L |

Primary Examiner—William C. Cooper
Assistant Examiner—Joseph Popek
Attorney, Agent, or Firm—Harry L. Newman

[57] ABSTRACT

A substation circuit in accordance with the present invention includes a light emitting diode (LED) connected in parallel with the speech network of the associated telephone set, the speech network including a carbon transmitter, a receiver, and a hybrid coil. The LED is connected in series with a high ac impedance to prevent voice signals from being attenuated by the shunt path, and the LED is shunted by a varistor to provide high current and surge protection. The relative resistances of the illumination circuit and the speech network are such that at least one-fifth of the line current derived when the telephone set is connected to the longest telephone line loop is shunted through the LED path. The speech network components are selected so as to substantially compensate for the reduction in transmit level resulting from the reduced current flow through the transmitter.

14 Claims, 3 Drawing Figures 3,959,602

TELEPHONE SUBSTATION CIRCUIT

FIELD OF THE INVENTION

This invention relates to the field of telephone substation circuit and within that field to a line powered illumination circuit.

BACKGROUND OF THE INVENTION

The illumination of the telephone dials of premium telephone sets is presently achieved by the use of an incandescent lamp that is powered from a 110 volt ac source on the subscriber's premises. The low voltage power for operating the lamp is derived by means of a voltage reducing transformer that is plugged into an ac receptacle of the subscriber. The transformer is connected by a power cord to a telephone junction box, and a nonstandard six conductor line cord completes the connection to the telephone set.

The foregoing components and their installation result in increased costs to the telephone company over that involved in providing a non-illuminated set. Furthermore, inasmuch as incandescent lamps have a limited life, there is the likelihood of the telephone company having to periodically send a serviceman to the subscriber's residence to replace the lamp, resulting in an additional significant cost. Finally, the connection of a 110 volt ac source to the telephone set, even though buffered by a step down transformer, introduces a possible hazard to the user as well as to the individual who must install and service the telephone set.

In view of the foregoing there has been an interest in replacing the incandescent lamp by an illumination source that has a much longer life and that can be energized by the low voltage dc power on the telephone line.

One such arrangement is described in U.S. Pat. No. 3,132,211 issued to E. E. Bauman on May 5, 1964. Bauman discloses a telephone dial light comprising an electroluminescent cell positioned beneath the number plate of a rotary dial. Since an electroluminescent cell requires ac excitation, Baumen's illumination circuit, which is connected across the telephone line conductors in parallel with the speech network, includes an inverter for converting the dc voltage of the telephone line to an ac voltage of a value to energize the cell. Thus, this arrangement has the disadvantage of necessitating an ac power supply circuit. It also has the disadvantage of again introducing ac potentials as high as 100 volts into the telephone set.

An arrangement for replacing the incandescent lamp which does not incur these disadvantages is described in U.S. Pat. No. 3,784,760 issued to R. M. Rickert on Jan. 8, 1974. Rickert discloses a telephone illumination circuit including a light emitting diode (LED) as a dial illumination source, the illumination circuit being connected across the telephone line conductors in parallel with the speech network. Power for energizing the LED is derived from the telephone line, but in order to insure that adequate power is available on long telephone loops, energy storage means in the form of a battery is included in the illumination circuit. The battery is connected so as to receive a steady trickle charge from the central office dc power applied to the telephone line, and when the set goes off-hook, the local battery is applied to the LED to provide the desired illumination. However, in order to prevent the battery from being discharged during the course of a long telephone call to the point that it is not capable of providing dial illumination for an immediately subsequent call, the illumination circuit further includes timing means for disconnecting the LED after a particular time interval.

SUMMARY OF THE INVENTION

A telephone set illumination circuit in accordance with the present invention requires neither an ac power supply circuit nor any energy storage means for its operation. Rather, it is powered directly from the telephone line, the phrase "powered directly from the telephone line" being herein defined to mean powered from the telephone line without additional circuitry that provides (1) auxiliary amplification of the audio signal (2) conversion to ac, or (3) energy storage. Furthermore, power is provided for the illumination circuit without degradation of the transmission levels from that found in "500 type" general purpose telephone sets.

The illumination circuit of the present invention includes an LED connected in parallel with the speech network of the associated telephone set, the speech network including a carbon transmitter, a receiver, and a hybrid coil comprising a plurality of mutually coupled inductances adapted to connect the transmitter and receiver in a conjugate relationship. The LED is connected in series with a high ac impedance to prevent voice signals from being attenuated by the shunt path, and the LED is shunted by a varistor to provide high current and surge protection. The relative resistances of the illumination circuit and the speech network are such that at least one-fifth of the line current derived when the telephone set connected to the longest telephone line loop, which for design purposes and the purpose of this patent is defined to be 21 kilofeet of 26 gauge copper wire, is shunted through the LED path. Furthermore, the speech network components are selected so as to substantially compensate for the reduction in transmit level resulting from the reduced current flow through the transmitter.

More specifically, in one embodiment, the speech network incorporates a high resistance carbon transmitter. It has been determined that the matched ac power output of the telephone transmitter is proportional to its dissipated dc power, and therefore if the transmitter resistance is substantially increased, dc current can be shunted therefrom by the light emitting diode with little effect on the transmission level. In a second embodiment, a similar result is achieved without employing a high resistance transmitter by instead removing a resistor in series with the transmitter in the general purpose network, thereby providing for a higher audio level. Furthermore, the network is matched to the aged rather than the initial resistance of the transmitter and the transformer air gap is reduced to increase its efficiency. The hybrid coil turns ratios are modified to maintain general purpose set transmission levels by increasing the fraction of transmitter power delivered to the telephone line and correspondingly reducing the fraction of line power delivered to the receiver.

DETAILED DESCRIPTION OF THE INVENTION

The dc current drawn by an off-hook telephone is used for two purposes. First it informs the central office that the associated telephone line has been seized and second it provides power for the carbon transmitter of the telephone set. Neither of these functions can be degraded when powering a light source, such as a gallium phosphide light emitting diode (LED), from the telephone line.

Thus while the placement of the LED in series with the speech network of a telephone set does not materially disturb the transmission level, it does excessively increase the resistance of the set. This is of consequence because in order to ensure central office supervision capability on the previously defined longest telephone line loop, it has been found desirable to design the station set resistance to a value below 200 Ohms at 20 milliamps, this being the approximate current provided to a set on such a loop. Conversely, placement of an LED in parallel with the speech network does not present off-hook supervision problems, but it does shunt current from the carbon transmitter, resulting in degradation of speech transmission. The substation circuit of the present invention employs the parallel arrangement but compensates for the reduced current flow through the carbon transmitter by proper selection of components in the speech network.

Figure 1:
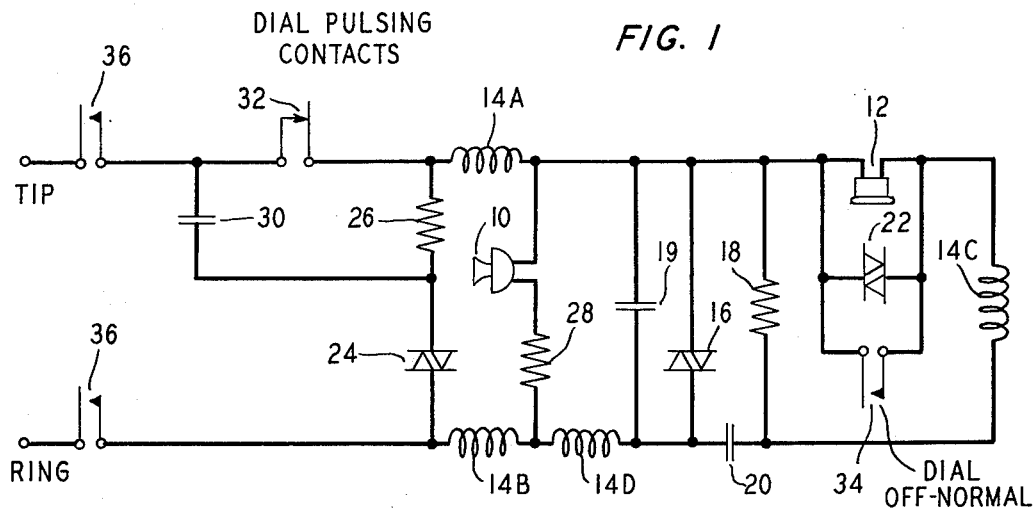
FIG. 1 is a schematic circuit diagram of a general purpose substation circuit in common use today.

By way of background, a circuit diagram of a standard "500 type" substation network is shown in FIG. 1. This circuit, which is described in detail in H. F. Hopkins U.S. Pat. No. 2,629,783 dated Feb. 24, 1953 and in an article entitled "An Improved Circuit for the Telephone Set" appearing on page 611 in Volume 32 of the Bell System Technical Journal, comprises a carbon transmitter 10 and a receiver 12 connected in an antisidetone circuit by means of a multiple winding hybrid coil 14. Line windings 14A and 14B, receiver winding 14C, and network winding 14D of the hybrid coil 14 are mutually coupled to obtain a conjugate relationship between the transmitter 10 and the receiver 12. This conjugate relationship is attained by proper poling of the windings and, as described in the appendix, by proper selection of the turns ratio of the windings.

Since the distance between a central office and the substation connected thereto varies from set to set, a sidetone balancing circuit is provided that includes a varistor 16, a resistor 18, and a capacitor 19. The resistance of the varistor 16 is nonlinear and is generally inversely proportional to the amount of direct current flowing through it from the central office battery. This current depends upon the resistance of the subscriber loop which in turn depends upon the distance of the substation from the central office (i.e., loop length). A capacitor 20 blocks dc from the receiver 12 and the resistor 18 so as to prevent power loss, and a second varistor 22 connected in parallel with the receiver prevents the voltage applied to the receiver from exceeding a level such that the output of the receiver is of a loudness to shock the ear of the user.

Transmission equalization is provided by a varistor 24 connected in series with a resistor 26 across the tip and ring line conductors, the varistor having a nonlinear resistance characteristic such that the transmission level of the substation circuit is regulated to narrower limits than provided by the resistance range of subscriber loops. On short loops, the varistor 24, in addition to having a low resistance so as to shunt current from the transmitter 10 and thereby reduce the transmitted power, also has a low ac impedance, thereby reducing the received power level of the set.

As indicated in the introduction of the Hopkins patent and in the corresponding Bell System Technical Journal article, the use of varistors to provide transmission equalization and sidetone balancing is an improvement over an earlier substation circuit disclosed in Botsford et al. U.S. Pat. No. 2,620,402 dated Dec. 2, 1952 and in an article entitled "An Improved Telephone Set" appearing at Page 239 of Volume 30 of the *Bell System Technical Journal*. In that circuit, transmission equalization is achieved by means of the tungsten filament of a lamp connected in series with the transmitter, the resistance of which filament is proportional to the current flow therethrough and thereby inversely proportional to the loop length. Sidetone balancing is achieved by a thermistor connected in parallel with the receiver and controlled in response to the heat generated by the equalizer filament. The resistance of the thermistor is inversely proportional to its temperature and consequently in this circuit its resistance is directly proportional to loop length.

Transmission standards were established on the basis of the Botsford circuit and when the varistors were introduced in place of the lamp filament and thermistor, a 22 Ohm resistor 28 was placed in series with the transmitter 10 in order to provide essentially the same transmission levels as in the lamp filament circuit. As a side effect, because the resistance of the carbon transmitter 10 varies from one time to another, resulting in the varistor 24 shunting varying amounts of dc from the transmitter, the resistor 28 also tends to keep the percent variation in transmitter output low.

The resistor 26 in combination with a shunting capacitor 30 form a filter across dial pulsing contacts 32, and when the dial (not shown) is operated, the receiver 12 is shorted by dial off-normal contacts 34. Switch hook contacts 36 connect the substation circuit to a central office or other exchange when the substation goes off-hook.

From the foregoing it is seen that in the standard telephone network, dc power is dissipated in the equalization varistor 24 and resistor 26, in the transmitter 10 and resistor 28, in the hybrid coil 14, and in the balancing varistor 16. However, in the longest telephone line loop situation, which as indicated above, is the situation in which approximately 20 milliamps of dc is available to power the substation network, the high resistance of the varistors results in less than a milliamp flowing in the balancing varistor 16 and a negligible amount of current flowing in the equalization varistor 24 and resistor 26. Hence the power available on the longest loop is essentially consumed by the carbon transmitter 10, line windings 14A and 14B of the hybrid coil 14, and the resistor 28. Therefore, power for driving an LED or any other auxiliary circuit connected in parallel with a telephone network must be taken from these power sinks.

Figure 2:
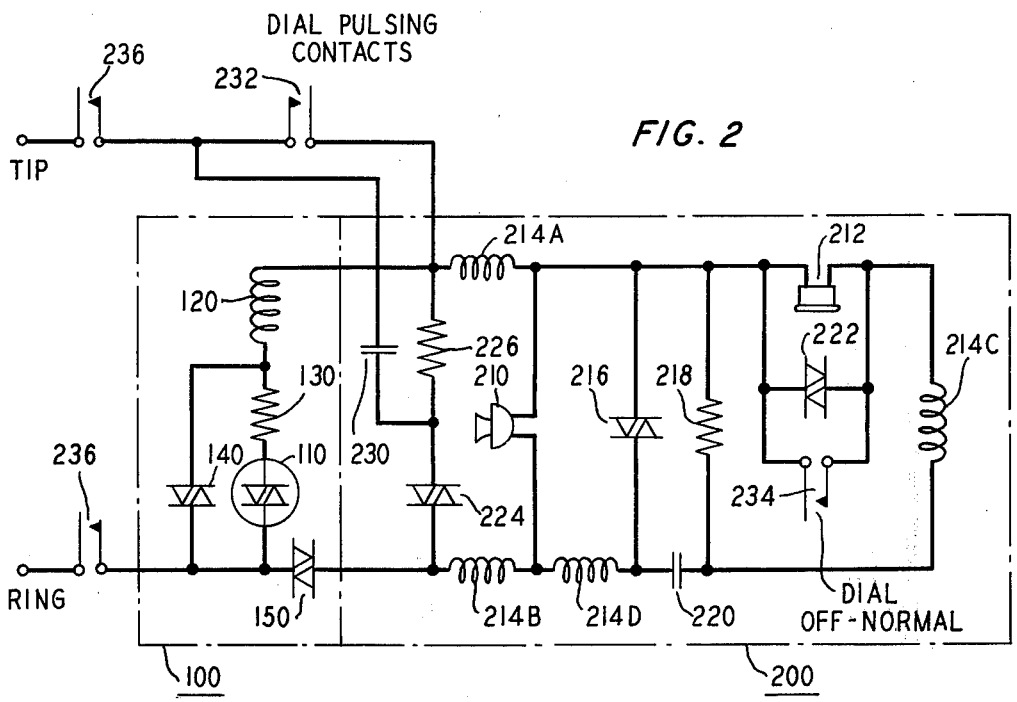
FIG. 2 is a schematic circuit diagram of a substation circuit in accordance with the present invention.

Referring now to FIG. 2 of the drawing, a substation circuit in accordance with the present invention is shown therein and comparable components to those included in the general purpose circuit shown in FIG. 1 have 200 added to the reference character thereof. The substation circuit comprises an illumination circuit 100 and a speech network 200, the illumination circuit including a pair of LEDs 110 connected across the ring and tip line conductors in parallel with the speech network. The pair of LEDs 110 are poled oppositely to one another so that irrespective of the polarity of line current, one or the other of the LEDs is illuminated when switch hook contacts 236 close.

The LED pair 110 is connected in series with a choke coil 120 which provides a high ac impedance to prevent voice signals from being attenuated by the LED shunt path. In addition, the LED pair 110 is connected in series with a resistor 130 which in combination with a varistor 140 connected in parallel with the LED pair and the resistor provides lightning surge and high current protection for the LED pair.

In one specific embodiment, the choke coil 120 has an inductance of 0.5 Henries and a resistance of 120 Ohms, while the resistor 130 has a resistance of 30 Ohms and the diode pair 110 and varistor 140 turn on at 1.8 volts and 2.8 volts, respectively. With this arrangement the current flow through the LED pair is limited to about 100 milliamps when a 600 volt lightning surge is applied to the circuit and this is well below the maximum tolerable pulsed current capability of the LEDs. Furthermore, with this arrangement current flow through the LED pair 110 is limited to below 50 milliamps in a zero loop situation and this is within the steady state current capability of the LEDs.

The final component of the illumination circuit 100 is a varistor 150 that is connected in series with the ring conductor between the LED shunt path and the speech network 200. The varistor 150 serves to raise the dc resistance of the network so that in the longest loop situation the current flow through the LED shunt path is high enough to provide at least the minimum level of illumination that is adequate for the purposes for which the illumination is intended. When, for example, the LED is encapsulated in a module configured in the manner set forth in Johnson U.S. Pat. No. 3,774,021 dated Nov. 20, 1973 and the module is coupled to a planar light guide associated with a telephone dial, it has been found that with existing production run green gallium phosphide LEDs, approximately 5 milliamps are needed to provide sufficient illumination to permit a subscriber to operate the dial in a darkened room. Thus, approximately one-fourth of the line current available in the longest loop situation would be shunted into the LED path.

The use of a varistor in this capacity is advantageous in that it has a low ac impedance and therefore the incoming or outgoing voice signals are not dissipated therein. In addition its resistance decreases as line current increases, and therefore on short loops, where it is not needed, it to a large degree disappears. Furthermore, because it is positioned on the line side of line windings 214A and 214B of hybrid coil 214, even on the longest loop its resistance is only a small percent of the line resistance.

From a component standpoint, the major difference between the speech network 200 and the general purpose circuit shown in FIG. 1 lies in the elimination of a resistor in series with the transmitter 210. In the general purpose circuit, part of the ac power generated by the transmitter 10 is dissipated in the resistor 28 and therefore the elimination of this resistor results in an increase in the transmission level. In the general purpose circuit in common use, the removal of the 22 Ohm resistor 28 results in about a 1.5 db increase in transmit level on the longest loop, assuming adjustment of the turns ratio of the windings of the hybrid coil 14, in accordance with equations set forth in the appendix, to maintain matched and balanced conditions. This change alone permits approximately 3 milliamps on the longest loop to be shunted into the LED path without causing any degradation of the transmit level.

One means of obtaining additional current is to employ a carbon transmitter 210 having higher resistance than the 65 Ohm design value of the general purpose transmitter 10 in common use, the design value being the approximate resistance of the transmitter at the time of manufacture at the operating current level on the longest loop and the value used in the network design. The transmitter 210 resistance can be increased significantly in this circuit without excessively increasing the station set resistance because of the presence of the LED path in parallel with the transmitter. The ac impedance of a carbon transmitter is proportional to its resistance, and at a given modulation index the generated ac voltage is proportional to the dc voltage across the transmitter. Thus the matched ac power output of a carbon transmitter is proportional to its dissipated dc power, and an increase in the resistance of the transmitter effects an ac impedance transformation which, upon adjustment of the circuit parameters to retain matched conditions, results in the same transmission level at a lower dc current.

Furthermore, the resistance of a carbon transmitter is current dependent. The design value of 65 Ohms refers to a 20 milliamp operating current level, and a lower operating current level leads to a higher resistance for the same transmitter. The relationship $$R_2 = R_1 \left( \frac{I_1}{I_2} \right)^{1/2}$$

where $R_1$ is the resistance of the transmitter at an operating current level of $I_1$ and $R_2$ is the resistance of the transmitter at an operating current level of $I_2$, is a good approximation for determining the transmitter resistance at different operating current levels. All subsequent references to transmitter resistance is understood to be at the paticular operating current level the transmitter is subjected to.

As an extreme example, assuming negligible hybrid coil resistance and 0.7 and 3.3 volt drops respectively across the varistor 150 and the transmitter 210 resulting from 20 milliamp set current and 200 Ohm set resistance, the properly transformed transmitter resistance is approximately 400 Ohms. The transmitter current is then only 8 milliamps, leaving 12 milliamps for the LED shunt path. The dc power dissipated in the transmitter 210 is the same as in the general purpose circuit and most of the power dissipated in the LED shunt path is power previously dissipated in the hybrid coil.

Of course the hybrid coil 214 resistance is not negligible, but the lower current level through a higher resistance transmitter 210 does result in decreased $I^2R$ loss in the hybrid coil, and this power is available for the illumination circuit 100. Additional power can be obtained by reducing the resistance of the hybrid coil 214, but to a large degree this depends upon the physical volume that can be dedicated to the hybrid coil inasmuch as the greatest resistance reduction results from using a heavier gauge wire in the windings.

While it is not realistic to increase the transmitter 210 resistance to a value of several hundred Ohms because carbon burning becomes a problem at higher voltage levels, an increase of the transmitter resistance to about 200 Ohms is feasible assuming adjustment of the circuit parameters and in particular the windings of the hybrid coil 214 to maintain matched and balanced conditions. In one embodiment in which the gain derived from eliminating the resistor in series with the transmitter was not utilized, a transmitter with a resistance of 170 Ohms was used. The receiver impedance was doubled to 300 Ohms at 1000 Hertz to satisfy network conditions while minimizing hybrid coil and component changes. In a longest loop simulation the transmitter 210 drew 12 milliamps while the current in the LED path was 8.5 milliamps. There was no degradation of either transmit or receive levels. Furthermore, with the gain derived from eliminating the resistor in series with the transmitter being utilized, a transmitter having a design value of approximately 85 Ohms resistance permits the approximate 5 milliamps found necessary for LED dial illumination to be shunted from the transmitter without degradation of the transmit level.

In view of the fact that in this last example the design value of the transmitter resistance is increased a relatively small amount over that of the general purpose transmitter and part of this increase is satisfied by the increase in transmitter resistance that accrues with a decrease in transmitter current from 20 milliamps to 15 milliamps, it follows that if a small additional source of signal gain can be obtained, an alternate solution exists which does not necessitate changing the carbon transmitter and permits the use of the general purpose carbon transmitter. This additional source of signal gain is derived by decreasing the air gap in the hybrid transformer and thereby increasing its efficiency. The air gap is selected to prevent saturation of the hybrid transformer at a highest line current design value, this design value being the highest line current that is applied to a substation circuit on a zero loop under normal line conditions. The air gap can be reduced since the LED shunt path diverts current from the hybrid windings, providing a lower saturation level in the transformer core.

In a specific embodiment, the TRIMLINE dial-in-handset telephone circuit was modified to incorporate LED illumination. TRIMLINE is a registered trademark of the AT&T Company. In the designing of the existing TRIMLINE phone, space limitations had made it necessary to use a hybrid coil that is smaller than that in the general purpose set and this smaller coil is slightly less efficient. Therefore, the 22 Ohm resistor in series with the transmitter in the general purpose set was omitted from the TRIMLINE set. This more than compensated for the reduced efficiency of the hybrid coil, and the turns ratios of the layered windings were selected, in the manner described in the appendix, to tradeoff the resulting increase in transmit level for an increase in receive level. This tradeoff had the effect of maintaining a reasonable sidetone level. However, it has been found that the TRIMLINE network with nominal valued components has a receive level of between 1 and 1.5 db higher than the general purpose network. By redesigning to match the transmission characteristics of the general purpose network and improving the efficiency of the hybrid transformer, current is obtained for the LEDs.

In this specific embodiment, the windings of the hybrid coil of the TRIMLINE telephone network were modified in the following manner. The turns of line windings 214A and 214B were maintained at 580 while the turns of network winding 214D were changed from 311 to 610 and the turns of receiver winding 214C were changed from 497 to 428. Thus as defined in the appendix, the turns ratio $n$ was changed from 0.268 to 0.526 and the turns ratio $m$ was changed from 0.429 to 0.369.

These changes provide two results. First, the network is designed to have matched conditions for a transmitter resistance of 130 Ohms at 10 milliamps. This transmitter resistance is higher than the design value of the transmitter, but aging of the carbon in the transmitter results in the transmitter resistance rising to this level over a period of time. Furthermore, as the carbon in the transmitter continues to age the matched resistance value is in fact exceeded. However, a fairly uniform transmit level as a function of carbon aging is attained because of the diversion of transmitter current into the LED shunt path with rising transmitter resistance.

The second result provided by the change in turns ratio is that $P_{TL}$, the fraction of transmitted power delivered to the line, is changed from 0.52 to 0.73, and $P_{LR}$, the fraction of line power delivered to the receiver, is changed from 0.48 to 0.27. This produces a 1.5 db increase in transmit level and a 2.4 db decrease in receive level in the longest loop situation. The relationship between $P_{TL}$ and $P_{LR}$ is described in the appendix.

This 1.5 db increase in transmit level offsets almost one-half of the decrease in transmit level resulting from the shunting of current from transmitter 210 by the choke coil 120, resistor 130, and LED pair 110 connected in parallel therewith. And as previously explained, the reduced current flow through the transmitter 210 results in an increase in the resistance of the transmitter, which provides an increase in transmitter power that also partially offsets the decrease in transmit level.

Furthermore, the shunting of a significant fraction of the DC current into the LED path before the hybrid coil 214 permits the air gap in the transformer to be reduced, decreasing transformer losses, increasing the efficiency, and thereby achieving a gain in both transmit and receive levels.

The net effect of these changes in the speech network 200 in combination with the addition of the illumination circuit 100 is to provide sufficient power for adequate illumination of the LEDs, while at the same time achieving approximately the same transmit and receive levels as found in the general purpose set. In the foregoing specific embodiment, approximately 7 milliamps is supplied for the LED shunt path and approximately 13 milliamps is supplied for the transmitter in the longest loop situation.

In addition, the substation circuit of this invention provides two improvements over existing substation circuits. First, the extra degree of freedom introduced by the LED branch of the circuit stabilizes the station set resistance, the resistance of the set remaining relatively constant in spite of the increasing resistance of the transmitter resulting from carbon aging. Second, the LED branch adds to the quality of multi-extension service by shunting current into the transmitter at the expense of LED power when two or more sets are off hook.

While the substation circuit has been described with respect to a rotary dial telephone, the present invention is equally applicable to a multifrequency signaling telephone. Furthermore, while alternate ways have been described for providing power for the LED shunt path without degrading transmission levels, they are not mutually exclusive. Rather, these alternate approaches may be advantageously combined to permit the shunting of even more current to the LED path from the transmitter without adversely affecting transmission levels.

Finally, the network described herein is not limited to use with an illumination circuit. In general, the LED shunt path can be replaced by other phone-related auxiliary components and/or circuits connected in parallel with the speech network. Any such parallel circuit modifies the dc voltage levels that the line and network varistors are exposed to at different loop lengths and hence modifies their effect on equalizing the transmit and receive levels as a function of loop length. It is therefore necessary to employ varistor or varistor-resistor combinations designed for the specific application or to supplement the existing varistors with additional nonlinear components. In the illumination circuit, the LED itself plays the role of such a nonlinear supplementary element, the LED branch of the circuit taking a greater fraction of current on short loops than it does on long loops. These and other variations may be introduced without departing from the scope and spirit of the invention as defined in the appended claims.

APPENDIX

Figure 3:
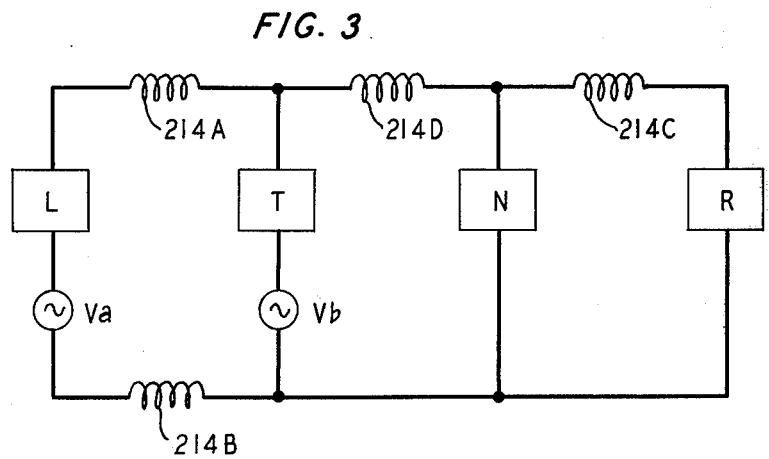
FIG. 3 is a schematic of the antisidetone network of the substation circuits of FIGS. 1 and 2.

Referring to FIG. 3, a schematic of the antisidetone network of the substation circuits of FIGS. 1 and 2 but with the reference characters of FIG. 2 is shown. The four branches of the network are the impedance L of the line, the impedance T of the transmitter arm, the impedance N of the network, and the impedance R of the receive arm. In addition, the mutually coupled windings of the hybrid coil 214 are represented, and the sum of the turns of the two line windings 214A and 214B is taken as unity while the ratio of the turns of network winding 214D to this sum is designated $n$ and the ratio of the turns of receiver winding 214C to this sum is designated $m$.

Network parameters are selected to satisfy a number of conditions. As its name indicates, a prime consideration is the suppression of excessive sidetone in the receiver during transmission. A second balance condition improves receive efficiency by suppression of received signals across the network resistor. It can be shown that these two conditions are respectively described by the following equations:

$$N = \frac{mn}{m+n+l} L \qquad (1)$$

$$R = \frac{M(n+m+1)}{n} T \qquad (2)$$

In addition it can be shown that the following equations respectively describe matched conditions for maximum power transfer from the line and from the transmitter.

$$L = \frac{(1+n)}{m(n+m)} R \qquad (3)$$

$$T = \frac{n(m+n)}{(n+1)(1+n+m)} L \qquad (4)$$

The line matched condition ensures maximum transfer of power into the set. However, only a fraction of this power, $P_{LR}$, is delivered from the line to the receiver. The remainder is lost in the transmitter. Similarly, only a fraction of the power generated by the transmitter, $P_{TL}$, is delivered to the line. Again it can be shown that these two conditions are respectively described by the following equations:

$$P_{LR} = \frac{m}{(n+1)(n+m)} \qquad (5)$$

$$P_{TL} = \frac{n(m+n+1)}{(n+1)(n+m)} \qquad (6)$$

It will be noted that $P_{LR} + P_{TL} = 1$. Therefore a tradeoff can be negotiated such that the receive level can be reduced and translated into a gain in the transmit level by an appropriate change in the turns ratio.

What is claimed is:
1. A telephone substation circuit comprising:
   a speech network including a carbon transmitter, a receiver, and a hybrid coil comprising a plurality of mutually coupled windings connected to the transmitter and receiver in a conjugate relationship;
   an auxiliary circuit connected in parallel with the speech network; and
   means for connecting the auxiliary circuit and the speech network to an associated telephone line,
   the auxiliary circuit being powered directly from the telephone line when the line connecting means is operated, the relative dc impedances of the auxiliary circuit and the speech network being such that at least one-fifth of the line current available in a longest telephone line loop is shunted through the parallel path of the auxiliary circuit, and the speech network components being such as to substantially compensate for the reduction in transmit level resulting from the reduced current flow through the transmitter.

2. A telephone substation circuit as in claim 1 wherein the speech network includes a line winding, a network winding, and a transmitter path connected to the line and network windings, the transmitter path consisting of just the transmitter.

3. A telephone substation circuit as in claim 1 wherein the carbon transmitter has resistance and the carbon transmitter has a design value of at least 85 Ohms.

4. A substation circuit as in claim 1 wherein the hybrid coil includes a core having a gap therein for preventing saturation of the core at a highest line current design value and the gap is less than the gap employed to prevent saturation at said highest line current design value with the auxiliary shunt path removed.

5. A telephone substation circuit including means for illuminating the telephone comprising:
   a speech network including a carbon transmitter, a receiver, and a hybrid coil comprising a plurality of mutually coupled windings connecting the transmitter and receiver in a conjugate relationship;

an illumination circuit including a light emitting diode connected in parallel with the speech network; and means for connecting the illumination circuit and speech network to an associated telephone line, the illumination circuit being powered directly from the telephone line when the line connecting means is operated, the relative dc impedances of the illumination circuit and the speech network being such that at least one-fifth of the line current available in a longest telephone line loop is shunted through the parallel path of the illumination circuit, and the speech network components being such as to substantially compensate for the reduction in transmit level resulting from the reduced current flow through the transmitter.

6. A telephone substation circuit as in claim 5 wherein the illumination circuit further includes a high ac impedance connected in series with the light emitting diode to prevent voice signals from being attenuated by the light emitting diode shunt path.

7. A telephone substation circuit as in claim 6 wherein the illumination circuit further includes a resistor connected in series with the light emitting diode and a varistor connected in parallel with the resistor and the light emitting diode, the combination providing lightning surge and high current protection for the light emitting diode.

8. A telephone substation circuit as in claim 7 wherein the illumination circuit further includes a varistor connected between the light emitting diode shunt path and the speech network to raise the dc resistance of the speech network.

9. A telephone substation circuit as in claim 8 wherein the illumination circuit includes a pair of light emitting diodes poled oppositely to one another so that irrespective of the polarity of line current, one or the other of the light emitting diodes is illuminated when the line connecting means is operated.

10. A telephone substation circuit as in claim 5 wherein the speech network includes a line winding, a network winding, and a transmitter path connected to the line and network windings and the transmitter path consists of just the transmitter.

11. A telephone substation circuit as in claim 5 wherein the carbon transmitter has resistance and the carbon transmitter resistance has a design value of at least 85 Ohms.

12. A telephone substation circuit as in claim 5 wherein the hybrid coil comprises a line winding, a network winding, and a receiver winding and with the ratio of the turns of the network winding to the line winding designated $n$ and the ratio of the turns of the receiver winding to the line winding designated $m$, the fraction of power generated by the transmitter that is delivered to the telephone line as determined by the equation $$\frac{n(m+n+1)}{(n+1)(n+m)}$$

is greater than 0.60 and the fraction of power delivered from the line to the receiver as determined by the equation $$\frac{m}{(n+1)(n+m)}$$

is less than 0.40.

13. A telephone substation circuit as in claim 5 wherein the hybrid coil comprises a line winding, a network winding, and a receiver winding and the turns of the windings are selected to provide a line matched condition for a transmitter impedance having a design value of greater than 85 Ohms and a line impedance having a design value of 750 Ohms in accordance with the equation $$T = \frac{n(m+n)}{(n+1)(1+n+m)} L$$

where T is the transmitter impedance, L is the line impedance, $n$ is the ratio of the turns of the network winding to the line winding and $m$ is the ratio of the turns of the receiver winding to the line winding.

14. A substation circuit as in claim 5 wherein the hybrid coil includes a core having a gap therein for preventing saturation of the core at a highest line current design value and the gap is less than the gap employed to prevent saturation of said highest line current design value with the LED shunt path removed.

* * * * *